July 4, 1939. J. HALTENBERGER Re. 21,138

AUTOMOBILE

Original Filed May 2, 1931 3 Sheets-Sheet 1

Inventor
JULES HALTENBERGER,
By Ashley & Mask
Attorneys

July 4, 1939. J. HALTENBERGER Re. 21,138

AUTOMOBILE

Original Filed May 2, 1931 3 Sheets-Sheet 2

Inventor
JULES HALTENBERGER,

By Ashley & Crooke

Attorneys

July 4, 1939. J. HALTENBERGER Re. 21,138

AUTOMOBILE

Original Filed May 2, 1931 3 Sheets-Sheet 3

Inventor
JULES HALTENBERGER,

By Ashley & Frank

Attorneys

Reissued July 4, 1939 Re. 21,138

UNITED STATES PATENT OFFICE 21,138

AUTOMOBILE

Jules Haltenberger, Ann Arbor, Mich.

Original No. 2,032,876, dated March 3, 1936, Serial No. 534,568, May 2, 1931. Application for reissue May 16, 1939, Serial No. 274,073

19 Claims. (Cl. 180—70)

My invention is concerned with automobiles of the type in which the engine is mounted at or near the rear end of the automobile and is operatively connected to the rear wheels through the usual clutch, change-speed transmission mechanism, and differential gearing. Mounting the engine transversely and preferably at the rear of the automobile frame is not new with me, as it has been done by prior inventors; but in prior constructions of which I am aware the arrangement of the parts has been such as either to preclude the use of engines of standard type or to make necessary a body design of unconventional, unattractive, and inconvenient proportions.

Further and more particularly expressed objects of the invention will appear as the description proceeds.

It is the object of my invention to arrange the driving mechanism of the automobile at the rear end of the frame in such a way that a standard engine can be used and without the necessity for departing greatly from body designs which are at present in favor. Another object is to obtain in an automobile provided with engine and driving mechanism at the rear those advantages which result from the use of independent wheel springing. A further object of my invention is to provide an adequate and efficient cooling system for use in an automobile having the engine mounted at the rear.

In carrying out my invention, I mount the engine at the rear end of the automobile with its crank-shaft arranged transversely of the automobile frame, the engine preferably being located in rear of a standard type of rear axle. When the engine is relatively long the change-speed transmission mechanism, instead of being disposed in alinement with the engine as is the customary practice, is placed ahead of the engine and is operatively connected thereto in any desired manner. Locating the engine at the rear end of the automobile makes it necessary, if the engine is of the liquid-cooled type, either to locate the radiator of the engine-cooling system in a position where it is not exposed to the air-draft created by movement of the automobile or to employ relatively long conduits for connecting the radiator to the engine. To eliminate or at least minimize these disadvantages, I employ two radiators, one located at the rear of the automobile and one located at the front in the usual position, and I employ means responsive to the temperature of the cooling liquid for controlling the flow of such liquid through the two radiators.

Figure 1:
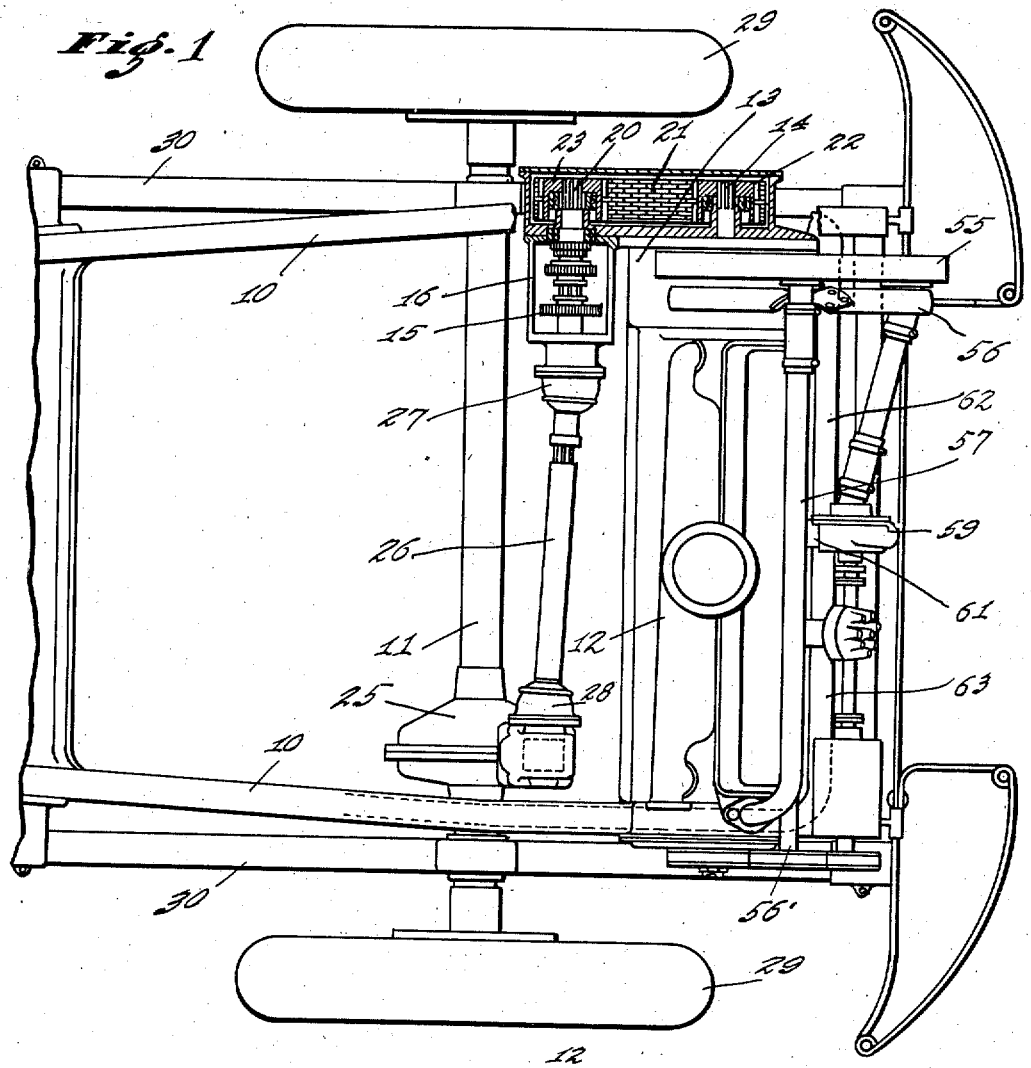
Figure 5:
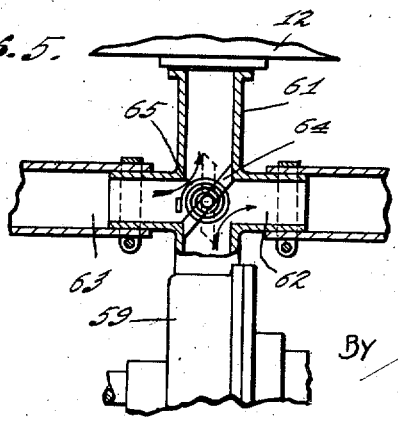
Figure 2:
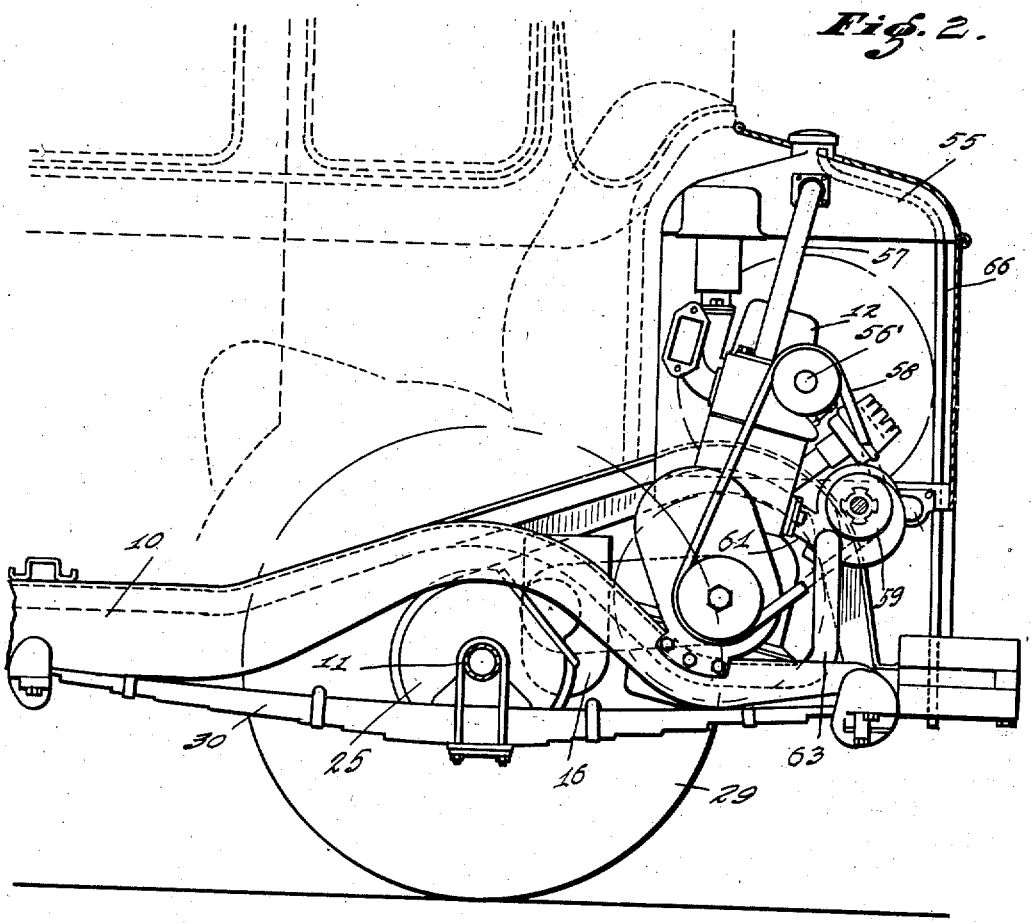
Figure 4:
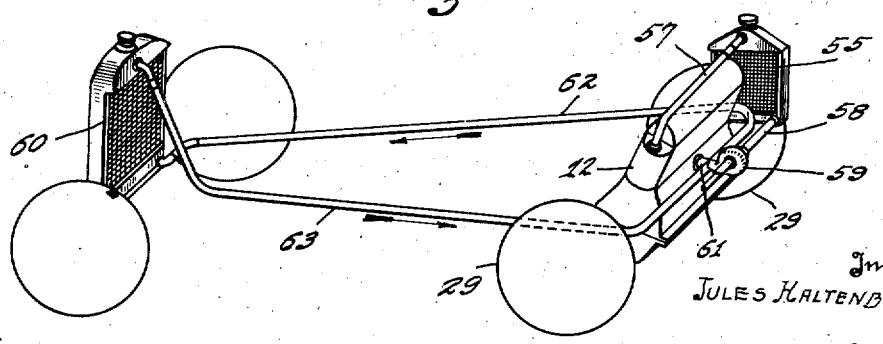
Figure 3:
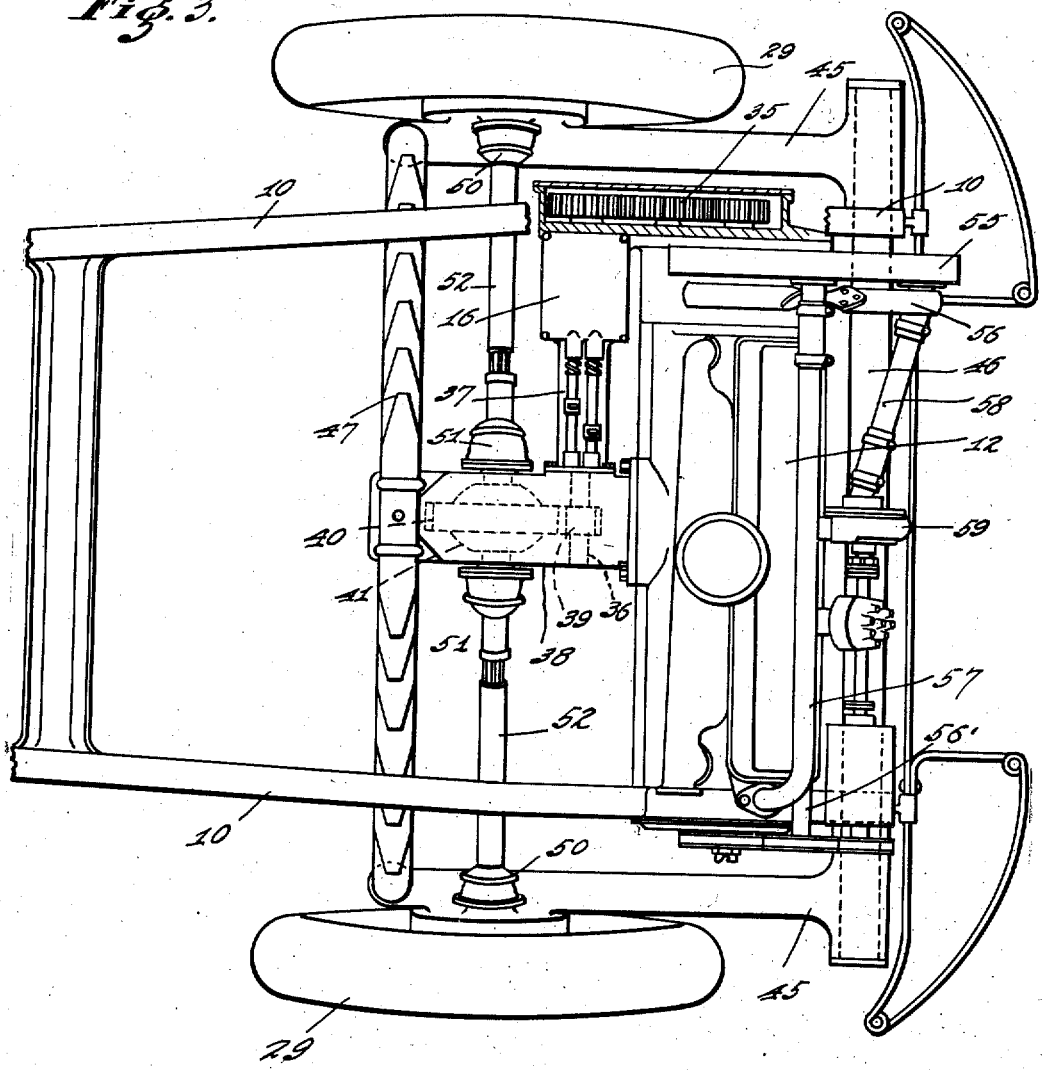

The accompanying drawings illustrate my invention: Fig. 1 is a fragmental plan showing the rear end of an automobile chassis; Fig. 2 is a fragmental side elevation of the rear end of the automobile chassis illustrated in Fig. 1; Fig. 3 is a view similar to Fig. 1 but illustrating a modified arrangement of the parts; Fig. 4 is a perspective view, largely diagrammatic, illustrating the engine-cooling system; and Fig. 5 is a detailed view illustrating the temperature-responsive device which controls flow of the cooling liquid.

In the construction illustrated in Figs. 1 and 2, the side members 10 of the automobile frame extend rearwardly beyond the rear axle housing 11 and, at or near their rear ends, support the engine 12. Associated with the engine at one end thereof is a clutch (not shown) located in a clutch-housing 13, such clutch being of any desired type and serving to control the operative connection between the engine and a clutch-shaft 14. The engine is so mounted that its crank shaft extends transversely of the automobile frame, the clutch shaft 14 desirably being in line with the crank shaft and also being located with its axis transverse to the automobile frame.

The change-speed transmission mechanism 15 is disposed within a casing 16 located ahead of the engine near that end thereof from which the clutch shaft 14 extends. The change-speed transmission may be of any desired type.

At its outer end, the change-speed transmission mechanism includes a driving shaft 20 operatively connected to the clutch shaft 14. As indicated in the drawings, this operative connection is provided by a silent chain 21 which drivingly interconnects sprockets 22 and 23 mounted on the outer ends of the clutch shaft 14 and the driving shaft 20 respectively.

The driven element of the transmission is operatively connected to differential mechanism of any desired type, such differential mechanism being mounted within a differential housing 25 forming part of the rear axle housing 11. This operative connection is desirably through a propeller shaft 26 connected at one end through a universal joint 27 to the driven element of the transmission 15 and at the other end through a second universal joint 28 to the differential gearing. In order to provide for relative movement of the axle housing 11 and the frame of the automobile, the shaft 26 is made of telescoping parts.

As is clear from Fig. 1, the differential housing 25 is displaced from the center of the rear axle housing 11 in order to increase the length of the propeller shaft 26 and to decrease its maximum angularity relative to the shafts which it interconnects. Aside from the fact that the differential housing is displaced from the center of the axle housing, the axle housing may be of any desired standard construction having drive wheels 29 rotatably mounted at its ends.

In the arrangement illustrated in Fig. 1, the drive is of the Hotchkiss type in which torque and driving thrust are transmitted from the axle housing 11 to the automobile frame by the springs 30 through which the frame is supported from the axle housing.

As is clear from Fig. 2, the engine, which is shown as of the type in which the several cylinders are all in the same plane, is mounted in such a way that the plane of the cylinders is inclined to the vertical, the upper ends of the cylinders being displaced rearwardly. By this arrangement, I am enabled to dispose the engine crank-shaft closer to the rear axle without decreasing passenger space in the interior of the automobile body, and to improve directional stability.

In mounting the engine as above set forth I have found it convenient to depart from the conventional practice in shaping the rear ends of the two side members 10 of the automobile frame. As shown in Fig. 2, the left-hand side member 10 is of substantially conventional design, having the usual "kick-up" in the vicinity of the axle housing 11 to provide clearance. The other or right-hand side member 11, however, is of different shape. Beginning at a point in advance of the rear axle, it slopes upwardly, this slope being continued for a considerable distance in rear of the axle housing 11, the side member being shown as attaining its greatest elevation at a point approximately above the engine crank-shaft. By this arrangement I am enabled to dispose the clutch-shaft 14, the transmission drive shaft 20, and the chain 21 beneath the right-hand frame member 10, thus making it possible to increase the over-all length of the engine, clutch, and clutch-shaft 14 without the necessity for widening the automobile frame or increasing the tread of the rear wheels.

In the modification of my invention illustrated in Fig. 3 the engine 12 and transmission mechanism enclosed in the casing 16 are disposed as before—namely, the transmission mechanism is disposed ahead of the engine adjacent one end thereof. In this arrangement, instead of a chain-drive, I have shown gearing 35 for the purpose of connecting the clutch shaft with the driving element of the transmission mechanism.

The driven element of the transmission is in the form of a shaft 36 which extends transversely of the automobile frame through a casing 37 into the differential housing 38. Within the differential housing 38, there is mounted on the shaft 36 a pinion 39 meshing with the drive gear 40 of the differential mechanism 41. In this arrangement, the differential housing 40 is rigidly attached to the automobile frame. This attachment may take any desired form, that shown in the drawings being effected by securing the rear end of the differential housing 38 to the front of the engine crank-case, but any other method of support may be used if desired.

The drive wheels 29 are rotatably supported respectively on arms 45 which extend rearwardly from the wheel axes and are pivotally attached on horizontal transverse axes to the rear end of the automobile frame, this attachment conveniently being effected by journaling the arms 45 on the outwardly projecting ends of a tubular cross-member 46 which extends transversely of the automobile frame and is secured to the side members 10 adjacent the rear ends thereof.

At or near their front ends, the two arms 45 are resiliently connected to the automobile frame, this connection being shown in the drawings as provided by a leaf spring 47. At its center, the spring 47 is secured to the automobile frame or to some part rigid therewith, such as the differential housing 38. The spring extends transversely and at its ends engages the two arms 45.

Each of the drive wheels 29 is connected to the differential mechanism through a pair of universal joints 50 and 51 and through a telescoping propeller shaft 52.

One of the objections to independent wheel suspension in automobiles of the conventional type—i. e., automobiles in which the engine is disposed with its crank shaft parallel to the longitudinal center line of the frame—is that the transmission of transverse vibration and torque reaction of the engine to the automobile frame is considerably greater than when rigid axles are used. By mounting the engine so that transverse vibration and torque reaction occur in planes transverse to the axes of the wheels, this objection to independent suspension of the wheels is eliminated.

The cooling system which I prefer to employ with a liquid-cooled engine mounted at the rear of the frame is illustrated diagrammatically in Fig. 4. In this arrangement, a radiator 55, which may be considerably smaller than standard proportions, is mounted at the rear end of the automobile, conveniently above the clutch housing 13. The radiator 55 is disposed in a vertical plane generally parallel to the longitudinal center-line of the automobile and may have associated with it the usual radiator-cooling fan 56 which is mounted on a shaft 56'. The transverse arrangement of the engine permits the fan shaft 56' to be parallel to the engine crank-shaft and allows of a simple fan-shaft drive such as is provided by a belt. In accordance with usual practice, the upper portion of the water-jacket of the engine is connected to the upper end of the radiator through a conduit 57, while the lower end of the radiator is connected through a conduit 58 to the inlet of an engine-driven pump 59 that discharges into the lower portion of the engine water-jacket.

In cool weather, the radiator 55 will provide all the cooling required. The pump 59 will circulate the cooling liquid upwardly through the water-jacket, and to the radiator 55 through the conduit 57. As the water passes downwardly through the radiator it is cooled by the air draft induced by the fan 56, and the cooled liquid is returned to the water-jacket of the engine by the pump 59.

To provide for the greater cooling capacity necessary in hot weather, I mount at the front end of the automobile an auxiliary radiator 60 and I provide means for connecting this auxiliary radiator into the liquid-circulating system whenever the temperature of the cooling liquid reaches or exceeds a predetermined maximum. To this end, I may employ the construction shown in Fig. 5. In this arrangement, the pump discharges into the engine water-jacket through a conduit 61 having two branches 62 and 63, such two branches being connected respectively to the bottom and top of the auxiliary radiator 60. At the point where the branches 62 and 63 join the conduit 61, I mount a valve 64 which is movable under the influence of a temperature-responsive element 65 that is responsive to the temperature of the water discharged from the pump 59.

As illustrated in the drawings, the valve 64 is of the butterfly type and is shown in full lines as in the position it occupies when the auxiliary radiator 60 is connected in the water-circulating system. In this position, the valve 64 shuts off direct communication between the pump 59 and the water-jacket of the engine, connects the pump to the branch conduit 62, and connects the branch conduit 63 to the water-jacket of the engine. It will be apparent, therefore, that the engine-cooling liquid, after passing through the radiator 55 at the rear of the automobile, will be forced by the pump 59 through the conduit 62 to the bottom of the radiator 60. The liquid will pass upwardly through the radiator 60 and rearwardly through the conduit 63 to enter the water-jacket of the engine.

Upon a decrease in the temperature of the circulating cooling medium, the valve 54 will move from the full-line to the dotted-line position shown, and in such dotted-line position will open direct communication between the pump and the water-jacket of the engine in order that the cooling medium discharged from the pump may flow directly into the engine water-jacket without passing through the auxiliary radiator section 60.

By this arrangement of dual radiators 55 and 60, I eliminate the excess cooling capacity which most automobiles possess except in extremely hot weather. That is, except in extremely hot weather, the radiator section 55 will be adequate to cool the engine, and the cooling medium will not circulate through the auxiliary radiator 60 at the front end of the automobile. In extremely hot weather, when the capacity of the radiator 55 is insufficient adequately to cool the engine, the valve 64 will be moved to the position illustrated in full lines in Fig. 5, and the engine cooling medium will be circulated through both the radiators 55 and 60.

The engine cooling-system is provided with an overflow pipe 66 associated with the rear radiator 55, such pipe communicating with the interior of the system at a point near the top of the rear radiator 55. The conduits 62 and 63 and the front radiator 60 are sealed to prevent the escape of water from the cooling system otherwise than through the overflow pipe 66. This prevents the loss of cooling medium which might result when the automobile is on an incline with the radiator sections 55 and 60 at different elevations. By circulating the cooling medium upwardly through the front radiator 60 and discharging it from the top of such radiator, I prevent the formation of an air lock which might interfere with circulation of the cooling medium.

It will be noted from Figs. 1, 3 and 4 that the conduit 57, which conveys the cooling medium from the engine to the radiator 55, is connected to the water-jacket of the engine at the opposite end of the engine from that at which the radiator 55 is located. By this arrangement I decrease or eliminate the tendency of the cooling medium to be thrown into the radiator and to escape through the overflow pipe under the influence of centrifugal force which results when the automobile is negotiating turns at right speeds.

I do not wish to be limited to the use of two radiators; for certain purposes I provide the radiator 55 with sufficient area to cool the engine, or I may employ the front radiator only.

I claim as my invention:

1. In an automobile having a frame, rear drive wheels, and an axle housing on which said wheels are mounted, an engine mounted on said frame in rear of said axle housing, said engine being disposed transversely of said frame; change-speed transmission mechanism disposed between said engine and said axle housing and adjacent one side of said frame, and power-transmitting connections between said engine and said change-speed transmission mechanism and between the latter and said wheels, said connections including differential mechanism supported in said housing near that end thereof which is opposite said transmission mechanism.

2. In an automobile having a frame, rear drive wheels, and an axle housing on which said wheels are mounted, an engine mounted on said frame in rear of said axle housing, said engine being disposed transversely of said frame; change-speed transmission mechanism disposed spatially between said engine and said axle housing, and power-transmitting connections between said engine and said change-speed transmission mechanism and between the latter and said wheels, said last named power-transmitting connection including a differential mechanism spaced laterally of said frame from said change-speed transmission mechanism.

3. In an automobile having a frame, rear drive wheels, means resiliently and independently connecting said wheels to said frame, an engine mounted transversely on said frame in rear of a vertical plane containing the axes of said wheels, change-speed transmission mechanism disposed between said engine and such plane and near one side of said frame, differential mechanism supported by said engine near the transverse center of the frame, and power transmitting connections for connecting said engine to said wheels through said transmission and differential mechanism.

4. In an automobile having a frame, rear drive wheels, and an axle housing on which said wheels are mounted, an engine mounted on said frame near the rear of said frame, said engine being disposed transversely of said frame; change-speed transmission mechanism disposed between said engine and said axle housing and adjacent one side of said frame, and power-transmitting connections between said engine and said change-speed transmission mechanism and between the latter and said wheels, said connections including differential mechanism supported in said housing near that end thereof which is opposite said transmission mechanism.

5. In an automobile having a frame, rear drive wheels, and an axle housing on which said wheels are mounted, an engine mounted on said frame near the rear of said frame, said engine being disposed transversely of said frame; change-speed transmission mechanism disposed spatially between said engine and said axle housing, and power-transmitting connections between said engine and said change-speed transmission mechanism and between the latter and said wheels, said last named power-transmitting connection including a differential mechanism spaced laterally of said frame from said change-speed transmission mechanism.

6. In an automobile, a frame, approximately coaxial drive wheels for the automobile located near the rear of said frame, an engine supported from said frame in transverse position near said drive wheels and with its crankshaft in rear of a vertical plane containing the axes of said driving wheels, a power output element in alinement with said crankshaft at the end of said engine, a differential mechanism located between said wheels and operatively interconnected therewith, means including a change speed transmission mechanism and a drive-shaft interconnecting said output element with the input side of said differential mechanism, and means for resiliently and independently connecting said wheels to said frame.

7. In an automobile, a frame including side-members, a cross-member interconnecting said side-members at their rear ends and providing journal bearings at its ends, a forwardly extending swinging arm pivotally mountetd on each of said bearings, a supporting wheel rotatably mounted on each of said swinging arms, said two wheels being approximately co-axial, an engine transversely mounted between said cross-member and a vertical plane containing the axes of said wheels, means for operatively interconnecting said wheels to said engine, and springing means interposed between said frame and each of said swinging arms.

8. In an automobile, a frame, a pair of swinging arms journaled on a generally transverse axis on said frame, frame supporting wheels carried respectively by said arms, an engine mounted transversely on said frame between said axis and a vertical plane containing the axes of said wheels, a differential housing mounted on said frame between said wheels and containing differential mechanism, means including a drive shaft interconnecting the output end of said engine to said differential mechanism, articulated axle shafts interconnecting said differential mechanism and said wheels, and springing means interposed between the free ends of said arms and said frame.

9. In an automobile, a frame, a pair of swinging arms journaled on a generally transverse axis at the rear of said frame, frame supporting wheels carried respectively by said arms, an engine mounted transversely on said frame between said axis and a vertical plane containing the axes of said wheels, a differential housing mounted on said frame between said wheels and containing differential mechanism, means including a drive shaft interconnecting the output end of said engine to said differential mechanism, articulated axle shafts interconnecting said differential mechanism and said wheels, and springing means interposed between said arms and said frame.

10. In an automobile having a frame, rear drive wheels, means resiliently and independently connecting said wheels to said frame, an engine mounted transversely on said frame in rear of a vertical plane containing the axes of said wheels, change-speed transmission mechanism disposed between said engine and such plane and near one side of said frame, and power-transmitting means including differential mechanism for connecting said engine to said wheels through said transmission mechanism.

11. The combination as set forth in claim 3 in which said transmission and differential mechanisms are rigid with said engine.

12. In an automobile, a frame, a pair of drive-wheels for the automobile, means resiliently and independently connecting said wheels to said frame, an internal combustion engine supported from said frame in transverse position with its crank shaft generally parallel to a vertical plane containing the axes of said wheels, a power output element alined with said crank shaft at one end of said engine, a differential housing located at the side of said engine and rigidly secured thereto, and power transfer mechanism connecting said differential with said power-output element and with each of said driving wheels.

13. In an automobile, a frame, a pair of transversely disposed pivot bearings rigid with said frame, a longitudinally extending swinging arm pivotally journaled on each of said pivot bearings, a supporting wheel rotatably carried by each of said arms, said arms and pivot bearings being adapted to maintain the axes of said wheels in substantially constant relationship to the axes of their respectively associated pivot bearings, a differential mechanism in a housing carried by said frame between said wheels and disposed in a vertical plane containing the axes of said wheels, articulated means operatively connecting said differential mechanism to said wheels, means for driving said differential mechanism, and a single transverse spring system carried by said frame on the other side of said wheel-axis containing plane from said pivot bearings, the free-ends of said arms extending through said plane into engagement with said spring system.

14. The combination set forth in claim 13 in which the axes of said wheels are oppositely inclined with respect to a plane containing the axes of said pivot bearings and cutting said wheel axes, whereby said wheels lean outwardly.

15. In an automobile, a frame, a pair of drive wheels for the automobile, means resiliently connecting said wheels to said frame, an internal combustion engine supported from said frame in transverse position with its crank shaft generally parallel to a vertical plane containing the axes of said wheels, a power-output element alined with said crank shaft at one end of said engine, a differential housing located at the side of said engine and secured thereto, and power transfer mechanism connecting said differential with said power-output element and with each of said driving wheels.

16. The combination defined in claim 15 in which the drive wheels are located at the rear of the frame.

17. In an automobile, a frame, a pair of drive wheels for the automobile, means resiliently connecting said wheels to said frame, an internal combustion engine supported from said frame in transverse position with its crank shaft disposed rearwardly of the wheel axes and generally parallel to a vertical plane containing the axes of said wheels, a power-output element alined with said crank shaft at one end of said engine, a differential housing supported on the automobile and carrying two universal joints and disposed between said wheels, and power transfer mechanism connecting said power output element with said differential and power transfer means between said universal joints and said driving wheels.

18. In an automobile having a frame, rear drive wheels, and an axle housing on which said wheels are mounted and which supports the frame, differential mechanism supported in the axle housing, drive shafts in the axle housing directly connecting the differential with the wheels, an engine mounted on said frame in rear of said axle housing, said engine being disposed transversely of said frame, change-speed transmission mechanism disposed adjacent one end of the engine, the said differential being spaced from the change-speed mechanism materially transversely of the frame, power transmitting mechanism connected between said engine and change-speed mechanism and power transmitting mechanism between the change-speed mechanism and differential including a generally transversely disposed propeller shaft connecting the change-speed mechanism with the differential.

19. The invention described in claim 18 where the differential is materially offset from the longitudinal center of the automobile in the direction which is opposite said change-speed mechanism.

JULES HALTENBERGER.